United States Patent
Zhang et al.

(10) Patent No.: US 10,217,346 B1
(45) Date of Patent: Feb. 26, 2019

(54) PRESENCE DETECTION WITH NEURAL NETWORKS

(71) Applicant: Amazon Technologies, Inc., Seattle, WA (US)

(72) Inventors: Ce Zhang, Cambell, CA (US); Ming Zheng, Santa Clara, CA (US); Peruvemba Ranganathan Sai Ananthanarayanan, Fremont, CA (US); Anuj Dron, San Jose, CA (US); Celalettin Umit Bas, Los Angeles, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/805,883

(22) Filed: Nov. 7, 2017

(51) Int. Cl.
| | |
|---|---|
| *H04W 24/00* | (2009.01) |
| *G08B 21/22* | (2006.01) |
| *G06N 3/08* | (2006.01) |
| *H04B 17/318* | (2015.01) |
| *H04W 8/24* | (2009.01) |
| *H04M 1/725* | (2006.01) |
| *H04W 4/02* | (2018.01) |

(52) U.S. Cl.
CPC .............. *G08B 21/22* (2013.01); *G06N 3/08* (2013.01); *H04B 17/318* (2015.01); *H04M 1/72519* (2013.01); *H04M 1/72522* (2013.01); *H04W 4/02* (2013.01); *H04W 8/245* (2013.01)

(58) Field of Classification Search
CPC ....... H04W 8/245; H04W 64/00; H04W 4/02; H04M 1/72525; H04M 1/72522; H04M 1/72529; H04L 29/08657; G01S 13/03; G01S 13/56

USPC ................... 455/456.1, 418, 550.1; 370/252
See application file for complete search history.

(56) References Cited

U.S. PATENT DOCUMENTS

| | | |
|---|---|---|
| 8,111,697 B1 | 2/2012 | Panwar et al. |
| 2008/0154816 A1 | 6/2008 | Xiao et al. |
| 2010/0157786 A1* | 6/2010 | Akita ................ H04L 5/023 370/210 |
| 2011/0274187 A1* | 11/2011 | Huang .............. H04L 25/0216 375/260 |
| 2013/0295983 A1* | 11/2013 | Kim .................... H04W 52/146 455/522 |
| 2014/0199970 A1* | 7/2014 | Klotz .................... H04W 12/02 455/411 |
| 2014/0266699 A1 | 9/2014 | Poder et al. |
| 2015/0189685 A1 | 7/2015 | Yao |
| 2015/0237513 A1* | 8/2015 | Garrett ............... H04L 25/0224 370/252 |
| 2016/0029224 A1* | 1/2016 | Edge .................... G01S 5/0252 455/456.1 |

(Continued)

*Primary Examiner* — Danh C Le
(74) *Attorney, Agent, or Firm* — Lowenstein Sandler LLP

(57) ABSTRACT

In a disclosed method, a computing device receiver, from a wireless receiver (RX), first data indicative of channel properties of a first communication link between the wireless receiver (RX) in a first device and a wireless transmitter (TX) in a second device. The first device and the second device are located in a building. The computing device further executes a neural network to process the first data to distinguish humans from stationary objects within the building and detect presence of the human in the building. The computing device transmits result data indicative of the presence to at least one of the first device or the second device.

18 Claims, 11 Drawing Sheets

(56) References Cited

U.S. PATENT DOCUMENTS

| | | |
|---|---|---|
| 2016/0132031 A1 | 5/2016 | Kozura et al. |
| 2016/0134342 A1* | 5/2016 | Kneckt ............... H04B 7/0452 |
| | | 375/267 |
| 2016/0163186 A1 | 6/2016 | Davidson et al. |
| 2016/0262050 A1* | 9/2016 | Merlin ................ H04L 5/0053 |
| 2017/0202774 A1 | 7/2017 | Ono et al. |
| 2017/0339692 A1* | 11/2017 | Chun ............... H04W 72/0446 |
| 2017/0343658 A1* | 11/2017 | Ramirez ............... G01S 13/56 |
| 2018/0004974 A1 | 1/2018 | Niedermeier et al. |
| 2018/0183650 A1 | 6/2018 | Zhang et al. |
| 2018/0246853 A1 | 8/2018 | Fowers et al. |

* cited by examiner

US 10,217,346 B1

PRESENCE DETECTION WITH NEURAL NETWORKS

BACKGROUND

Many buildings such as homes, retail stores, business centers, and the like, have a growing number of wireless transmission devices, including wireless transmitters and wireless receivers. These devices are sending an increasing amount of radio frequency (RF) energy through the buildings from many different directions.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
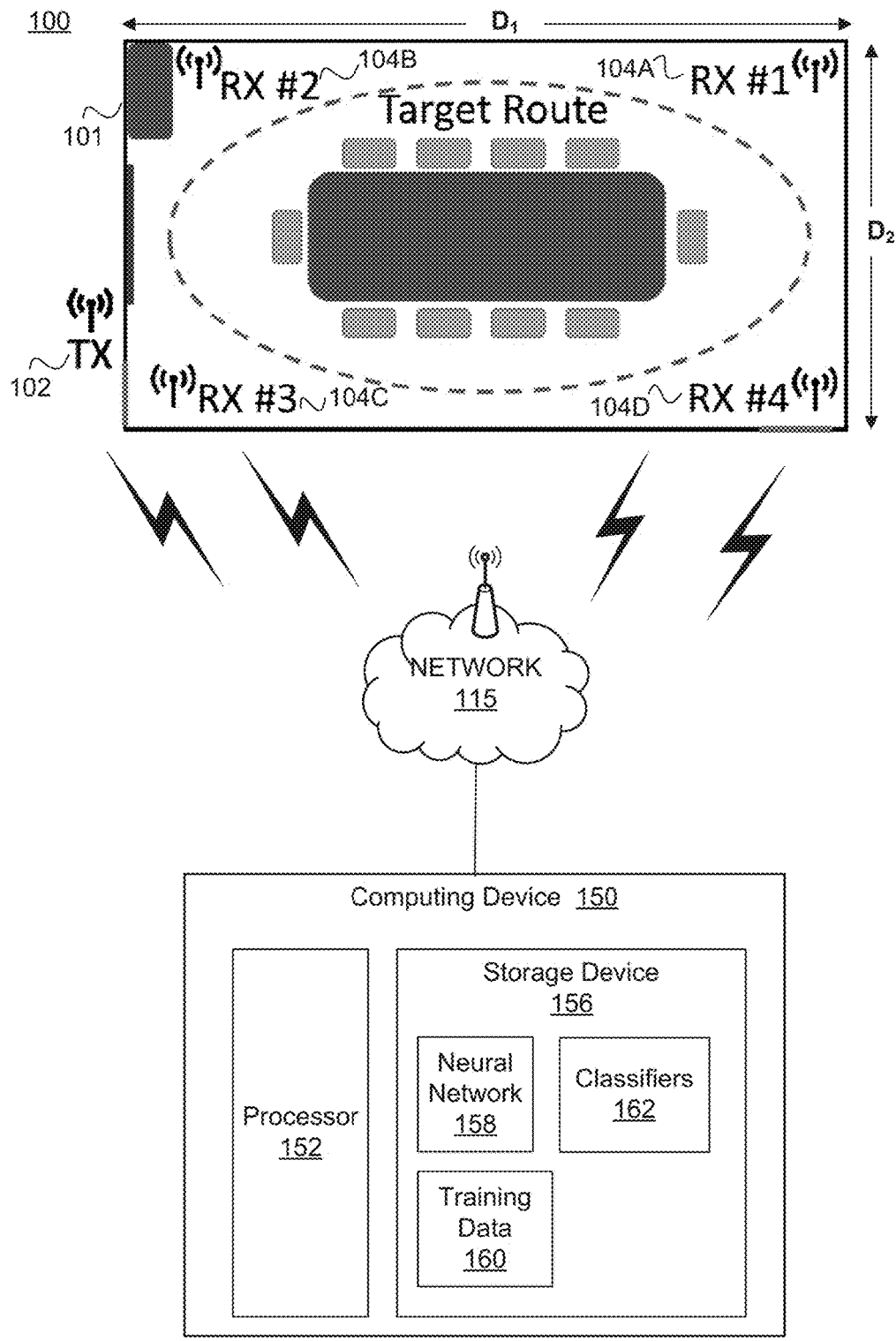
FIG. 1 is a block diagram of system for detecting presence of a human using an existing transmitter and one or more receivers using neural network technology, according to various embodiments.

Until now, presence detection (e.g., detecting a human moving within or near a building or other building) has been performed through motion sensors specifically designed to detect motion of a human. Motion sensors are expensive and are additional equipment required for purchase to complete a security system. Some detection or tracking systems track passive tags carried by users or need to access built-in Global Positioning System (GPS) capability, e.g., in order to track a person's location based on a smart phone, watch, or other GPS-capable device the person is carrying. Not everyone will carry such a GPS-capable device and certainly not necessarily one that is being tracked by a security system or a home automation system, e.g., those of visitors or intruders to a home or business.

To avoid the need to deploy motion sensors, passive tags, or to rely on expensive or inaccessible GPS-capable devices (e.g., that tag specific individuals), presence detection may be performed using neural networks to analyze data received from existing wireless transmitters or wireless receivers, which are available in growing quantities in today's homes and office environments. For example, such wireless transmitters (TX) and receivers (RX) may include, but not be limited to, wireless base stations such as modems, hubs, routers, and the like, and wireless receivers, such as digital media devices, network-attached storage (NAS) devices, mobile devices, smart thermostats, and other Internet-of-things-connected devices. These wireless TX and RX devices may be referred to generally as nodes herein. A node is a device having at least an antenna, a radio, and a processing component.

The present system and methods may detect the presence of a human in association with any of these wireless devices (e.g., when the human is within wireless range of these devices), and may do so through walls, around corners, behind doors, and through or around other objects. By applying neural network-based algorithms to data that includes radio frequency (RF) channel properties received from wireless devices, a computing device may predict the presence of a human inside of a home with a single node. The channel properties may come in different forms, such as power levels or amplitude and phase information of wireless signals in a transmission link between a wireless TX and a wireless RX. Furthermore, the computing device may achieve accurate localization of a detected human with two to three nodes, e.g., with two or more pairs of TX-RX links. The nodes may be spread out within a building and need not be placed in every room to be able to detect a human within range of a node.

For example, in one embodiment, a computing device may receive, from a wireless RX, first data indicative of channel properties of a first communication link between the wireless RX in a first device and a wireless transmitter (TX) in a second device, the first device and the second device being located in a building having one or more rooms. The computing device may process, by a neural network executed by the computing device, the first data to detect presence of a human in the building. The computing device may output result data indicative of the presence of the human. In one embodiment, the result data includes a presence indicator indicative of the presence of the human. The computing device may also transmit the presence indicator to at least one of the first device or the second device.

In various embodiments, the neural network applies a set of algorithms to the data to distinguish the human from pre-existing or stationary objects within the building. For example, the computing device may apply a separability function to the first data, to separate the channel properties according to a group of frequencies over a time period during which the wireless RX received the first data. This separation may generate a group of separated data, e.g., data associated with respective frequencies of the group of frequencies. The computing device may apply a plurality of weights to respective ones of the group of frequencies, to generate weighted data values. The computing device may combine the weighted data values to generate an output value to the neural network. The computing device may then apply an activation function to the output value to generate the presence indicator.

In an alternative embodiment, the computing device may receive data from a first wireless RX and a second wireless RX that are located in a building having one or more rooms. The data may include first channel properties in a first communication link between a wireless TX and the first wireless RX and second channel properties in a second communication link between the wireless TX and the second wireless RX. The first channel properties and the second channel properties may represent wireless signal propagation characteristics of wireless signals being transmitted within the building. The computing device may further process the first channel properties and the second channel properties with a multi-layer neural network to detect not only presence of a human in the building, but also determine a relative location of the human with respect to a closest of the first wireless RX, the second wireless RX, and the wireless TX.

In one embodiment, the computing device may generate a presence indicator (indicative of the presence) or a location indicator (indicative of the relative location), and transmit one or both of the presence indicator or the location indicator to a closest of the wireless devices in the building. In this way, the closest wireless device may become informed of, and act on, the presence of the human. For example, the closest wireless device may increase sampling of the channel properties to perform further presence detection where humans may again be expected. Other wireless devices that do not receive a presence or location indicator may reduce sampling for channel properties, and thus preserve bandwidth and reduce power consumption.

FIG. 1 is a block diagram of system 100 for detecting presence of a human using an existing transmitter (TX) 102 and one or more receiver (RX) 104A, 104B, 104C, and 104D using neural network technology, according to various embodiments. In some embodiments, a transmitter is combined within a receiver (e.g., a transceiver), which may play the role of a transmitter or receiver in different scenarios (see FIGS. 2A and 2B). The system 100 may include more or fewer of the TX 102 and the RXs 104A, 104B, 104C, and 104D, which may be located within a building, such as a home, an office space, or other meeting area.

The space depicted in FIG. 1 may, for example, be a large conference room 101 (e.g., room 101) that contains a number of wireless-capable receivers in the four corners of the room. Note that a "target route" is identified within the room as a route most likely to be traversed by people (e.g., humans) passing through the room. Also, in one example, the transmitter 102 is outside of a wall of the room 101 and therefore radiates radio frequency (RF) wireless signals through the wall. The wireless signals may be received by the receivers 104A, 104B, 104C, and 104D after any scattering (e.g., from reflection and refraction), fading, and power decay (over distance) of the wireless signals, each of which passes through various and different radio propagation paths. Accordingly, an exact location of each RX is not needed where a relative location in proximity of one of the receivers may provide a location of a human detected in the room, or detected near or in an adjacent room to a room that has a RX.

The TX 102 and RX 104A, 104B, 104C, and 104D may communicate with a computing device 150 through a network 115. The network 115 may include wireless aspects, but will likely connect wirelessly to the TX 102 and RX 104A, 104B, 104C, and 104D, e.g., by way of a local access point that provides an Internet or WAN connection. Such an Internet or WAN connection may include additional links or trunks, whether wired or wireless, that may involve other types of wideband communication, including those based on cellular standard(s).

The computing device 150 may include, for example, a processor 152 and storage device 156. The storage device 156, which may be understood to include memory, may include neural network (NN) algorithms 158 (e.g., code for the NN algorithms), training data 160, and pre-trained classifiers 162, which may be used in performing detection and location identification of persons within buildings. The pre-trained classifiers 162 may be hundreds or even thousands of classifiers of types of objects expected to be found in rooms of the building, such as furniture, built-in buildings, plants, indoor trees, moving items (both animate and inanimate, including pets), and different sizes and shapes of humans and those humans moving in different ways. The training data 160 may later be updated over time as people come and go through the room, and the data captured at the RX 104A, 104B, 104C, and 104D include additional data, including channel properties, captured during periods of time in which the room may change, and particularly with reference to detecting people moving within the room. This updated training data may then be used to further train the pre-trained classifiers 162, so that further NN presence and location detection may be improved.

Employing trained neural networks to perform presence and location detection may be performed on different types of channel property data, including Received Signal Strength Indicator (RSSI) data, Channel State Information (CSI), or a combination of both. Additional sources of signal characteristics, power, or channel properties or other channel information may also be employed, and therefore, RSSI and CSI are but a listing of understood and available forms of channel properties.

Accordingly, in one embodiment, a wireless RX may receive and transmit RSSI, which is a parameter (e.g., channel properties) that has a value of zero ("0") to a RSSI maximum value (referred to as "RSSI Max"), and is indicative of the signal strength of a wireless signal associated with a wireless network. Accordingly, RSSI is a measurement value of power present in received wireless signals, and contains a single value per packet. For example, RSSI can be measured as the power level of a radio frequency that a client device receives from an access point (AP), such as a wireless router. In another implementation, RSSI may be a measurement of the energy observed at the antenna by a wireless physical layer (PHY) of the receiver used to receive a current Physical Layer Convergence Protocol (PLCP) Protocol Data Unit (PPDU) of the receiver. In one implementation of a home wireless local area network (WLAN) (e.g., using the WiFi® technology), for example, the client device may generate the RSSI either based on a data frame received or a beacon from an AP node. The RSSI may fluctuate when the environment changes. Such changes can be caused by many factors, such as a moving a transmitter or receiver, moving objects nearby the AP or client, a change in ambient noise level, temperature swings, or other such factors that cause fluctuations in RSSI.

In another embodiment or implementation, a RX can measure and transmit CSI, which is data that includes channel properties of a communication link between a TX and RX. For example, a receiver within a node may retrieve the CSI from a baseband channel estimator with which to perform presence detection. The receiver may adjust the rate of sampling channel properties by the baseband channel estimator. The CSI may include a detailed channel impulse response with both amplitude and phase information across all the Orthogonal Frequency Division Multiplexing (OFDM) subcarriers and be updated (at the maximum rate) every OFDM symbol. This may provide more information about the environment under surveillance, and thus may improve detection capability when applying a NN, as discussed herein, to CSI data or CSI-liked data.

Figure 2A:
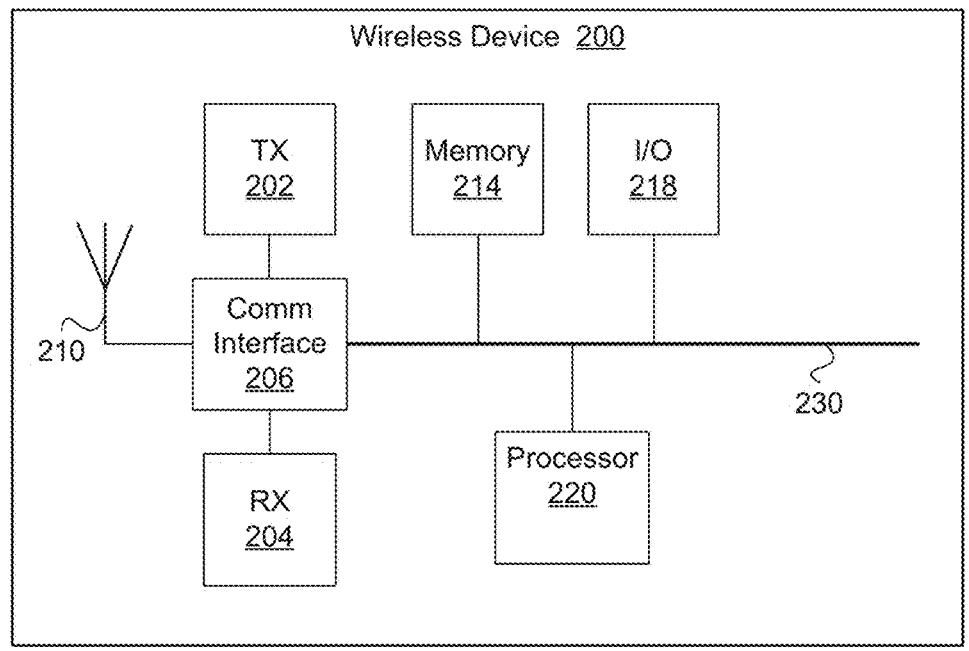
FIG. 2A illustrates a wireless device adapted to detect and transmit channel state information (CSI) or received signal strength indicator (RSSI) data useable by a NN to perform presence detection, according to various embodiments.

FIG. 2A illustrates a wireless device 200 adapted to detect and transmit channel state information (CSI) or received signal strength indicator (RSSI) data useable by a NN to perform presence detection, according to various embodiments. The wireless device 200 may include, but not be limited to, a transmitter (TX) 202, a receiver (RX) 204, a communications interface 206, one or more antenna 210, a memory 214, one or more input/output (I/O) devices 218, and a processor 220. These components may all be coupled to a communications bus 230. The I/O devices 218 may include an input device such as a microphone for detecting sound, e.g., for purposes of voice recognition, and a speaker, e.g., for purposes of communicating with a person based on the voice recognition. The processor may receive audio data through the microphone and transmit audio through the speaker in response to the audio data and also in response to presence or location indicators as will be discussed In one embodiment, the processor 220 may be configured to direct the TX 202 to transmit data, which includes channel properties, to a remote computing device over a network for neural network processing. The processor 220 may further be configured to direct the RX 204 to receive a response from the remote computing device containing a presence detection signal, which includes a neural network indicator (e.g., a presence indicator or a location indicator) that a human is present within wireless range of the antenna 210. The location indicator may make reference to a wireless RX that was the closest to detect the human, and in one example, is the wireless RX 204 of the wireless device 200.

The antennas (such as the antenna 210) described herein within various devices may be used for Long Term Evolution (LTE) frequency bands, third generation (3G) frequency bands, Wi-Fi® and Bluetooth® frequency bands or other wireless local area network (WLAN) frequency bands, including Zigbee®, Z-wave™ or the like, wide area network (WAN) frequency bands, global navigation satellite system (GNSS) frequency bands such as global positioning system (GPS) frequency bands, or the like.

Figure 2B:
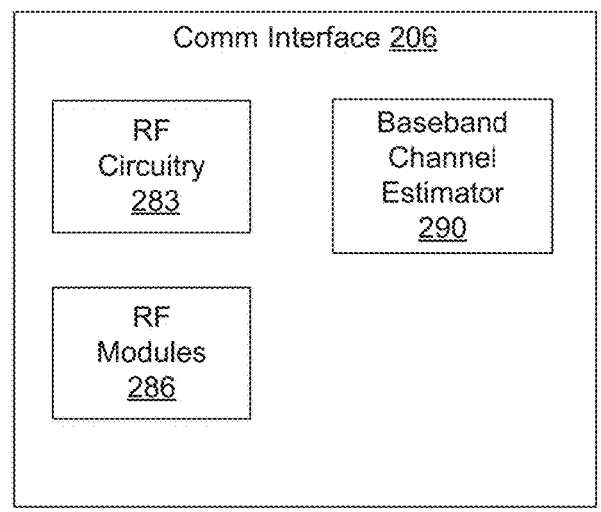
FIG. 2B is a block diagram of a detailed example of the communications interface 206 of FIG. 2A according to one embodiment.

FIG. 2B is a block diagram of a detailed example of the communications interface 206 of FIG. 2A. As illustrated in FIG. 2B, the communications interface 206 may further include RF circuitry 283, a set of RF modules 286, and a baseband channel estimator 290. A more detailed and alternative embodiment of a wireless device will be discussed with reference to FIG. 8. In one embodiment, one of the RF modules 286 may include a WiFi® PHY at which the RF energy of received RF signals may be measured for purposes of RSSI. The baseband channel estimator 290, by virtue of being incorporated within the communications interface 206, may be coupled to the antenna 210, the TX 202, and to the RX 204, and be adapted to estimate the CSI (or the RSSI) for each channel. As discussed, the CSI includes a detailed channel impulse response (e.g., containing channel properties) with both amplitude and phase information across all the OFDM subcarriers and is updated (at the maximum rate) every OFDM symbol. This provides more information about the environment under surveillance, and thus provides excellent detection capability when applying a NN, as discussed herein, to CSI data.

The wireless device 200 may, in various embodiments, continuously upload RSSI or CSI data to the computing device 150 (FIG. 1) for use in NN processing, or may buffer the RSSI or CSI data in the memory 214 (or other computer storage) and then periodically upload the RSSI or CSI data at a predetermined time interval. In one embodiment, the wireless device 200 (or a co-located computing system) is adapted to include sufficient memory, storage, and processor power to be able to directly perform the NN processing. Where these lack, however, the data upload to the computing device 150 may allow the NN processing to be performed in the cloud, e.g., on a networked server that receives the CSI or RSSI data from the wireless device 200 and, in some examples, from multiple wireless devices 200 for a given building.

In other embodiments, the wireless device 200 (or co-located computing system) may perform a portion of the NN processing. For example, the wireless device 200 may store in the memory 214 (or other computer storage) a copy of one or more classifiers received from a remote computing device such as the networked server. A classifier may have been trained to detect a human with the building, and thus is already adapted to the environment of the building. The wireless device 200 may then process updates to data containing channel properties, to generate updated data that contains recently received channel properties. This updated data may then be processed, by applying multiple weights from the classifier and within a NN, to generate a NN output indicative of the presence of the human. The use of the multiple weights within the NN will be discussed in more detail.

In various embodiments, the wireless device 200 may perform selective sampling of certain targeted routes or areas within a building where people have traversed multiple times in the past, and thus reduce the amount of unimportant data collected. To do so, the wireless device 200 (or a cloud server device) may monitor human traffic from past presence and location indicators (from NN processing) and identify a particular route based on presence patterns detected with the channel properties over time. For example, the origin of reflected signals may be detected as beginning in a first room, terminating in a third room, and passing through a second room, which rooms define the particular route. In one embodiment, data received and processed by the cloud server device may identify a presence pattern and transmit the presence pattern back to the wireless device 200, which may then determine that it is within wireless range of one or more portions of the route defined by the presence pattern. Furthermore, based on the prior knowledge of presence, locations, and walking routes of people in the building, the wireless devices nearest the particular routes that have been identified may actively monitor the channel properties and conduct at least a portion of the NN algorithm to determine presence and optionally location. To actively monitor may mean to increase a level of sampling of channel properties data by the baseband channel estimator 290 compared to a previous, periodic mode of sampling.

Additionally, the baseband channel estimator 290 of wireless devices in idle regions (e.g., parts of the building where humans rarely if ever walk) may slowly sample the channel properties until the channel properties are detected. To slowly sample channel properties means to sample at a rate slower than a previous, periodic mode of sampling. Avoiding a higher sampling rate means that wireless devices that are not actively monitoring for channel properties may reduce power consumption and traffic through its channels, thus also improving bandwidth.

In this way, the data about the unimportant communication link/channel properties will be reduced so that the power consumption of RF devices is also reduced. If performed by a remote server, the location of the route may be communicated back to the wireless device 200. With this information, the wireless device 200 may focus selective sampling in a pattern on that particular route and optionally throughout the day on a schedule depending on day and time, and what are the usual patterns for the people living in a particular building. For example, the processor 220 may direct the baseband channel estimator 206 to frequently sample the channel properties associated with a particular, previously dignified route, to save on bandwidth, processing power, and required storage in collecting relevant channel properties within CSI or RSSI data.

With further reference to FIGS. 1 and 2A, the computing device 150 may execute one or more algorithms to train the NN, using either supervised or unsupervised learning, to learn best how to distinguish human occupants from other objects normally expected in the building or in a building of that type. With supervised learning, NN-based algorithms are provided output datasets (e.g., the training data 160), which have been pre-classified (or pre-labeled) as associated with certain objects. The supervised learning attempts to map the data onto the pre-classified objects. Supervised learning uses a set of example pairs (x, y), x∈X, y∈Y and the aim is to find a function, f:X→Y, in the allowed class of functions that matches the example objects. In other words, the computing device executing the supervised learning seeks to infer the mapping implied by the RF characteristic measurement data. The computing device may also employ a cost function that is related to a mismatch between the mapping and the CSI data and that implicitly contains prior knowledge about the problem domain, e.g., various buildings in which detection is desired.

One example of a cost function is the mean-squared error. In another embodiment, other cost functions may be used. For example, if the softmax classifier is used (where the output are finite classes (e.g. either 1 or 0), the logarithmic cost function performs better than mean-square cost function, as the mean-squared error cost function is not always convex function in all optimization problems. For example, the logarithmic cost function may be expressed as $C=-(1-y)\log(1-f(x))+y\log(f(x))$. The mean-squared error cost function attempts to minimize the average squared error between the network's output, f(x), and the target value y over all the example pairs. Minimizing this cost using gradient descent for the class of neural networks is called multilayer perceptrons (MLP), which produces the backpropagation algorithm for training neural networks. Backpropagation is a method to calculate the gradient of the loss function (produces the cost associated with a given state) with respect to the weights in the NN. A perceptron algorithm is an algorithm for supervised learning of binary classifiers, e.g., functions that can decide whether an input, represented by a vector of numbers (e.g., frequencies in this case), belong to some specific class or not. Accordingly, the computing device 150 may apply a perceptron algorithm to the training data 160 to train the NN 158 and create additional pre-trained classifiers, and the training may be updated periodically based on updates to the training data 160 over time.

Tasks that fall within the paradigm of supervised learning are pattern recognition (also known as classification) and regression (also known as function approximation). The supervised learning paradigm is also applicable to sequential data (e.g., for presence detection, shape, and movement recognition). This can be thought of as learning with a "teacher," in the form of a function that provides continuous feedback on the quality of solutions obtained thus far.

With unsupervised learning, no datasets are provided; instead, the received data is clustered into different classes, which may then be categorized as certain objects. In unsupervised learning, some data x is given as is the cost function to be minimized, which may be a function of the data x and the network's output, f. The cost function is dependent on the task (the model domain, such as presence or location detection) and any a priori assumptions (the implicit properties of the model, its parameters, and the observed variables).

As just one example of unsupervised learning, consider the model given by f(x)=a where a is a constant and the cost is given as $C=E[(y-f(x))^2]$. Minimizing this cost produces a value of a that is equal to the mean of the data. The cost function can be much more complicated, of course. The form of the cost function depends on the application. For example, in compression, the form could be related to the mutual information between y and f(x), whereas in statistical modeling, the form could be related to the posterior probability of the model given the data. Tasks that fall within the paradigm of unsupervised learning are in general estimation problems; the applications include clustering, the estimation of statistical distributions, compression, and filtering. While detection in the present embodiments may be performed using both kinds of learning, supervised learning may be performed much quicker than unsupervised learning in terms of real-time performance after classifiers have been pre-trained.

In one embodiment, if training a neural network using RSSI data as the training data 160, the major part of a machine learning algorithm may need to be to be trained and refined at a customer's premises (e.g., using a network-connected device located at the premises of the room 100). Indeed, RSSI with maximum likelihood (ML) may not be sufficient for presence detection as there is no method for generating assets of known data for the on-premises training. In at least one embodiment, use of a wireless device (such as the wireless device 200 having a microphone and speaker) that is capable of voice detection may be able to tag RSSI data with human presence, thus enabling the on-premises training to take place. For example, when a user utters a wake-up word, the wireless device 200 may tag the RSSI from the built-in WiFi® of the RF modules 286, and use that as the training data for the maximum likelihood for the RSSI.

Figure 3:
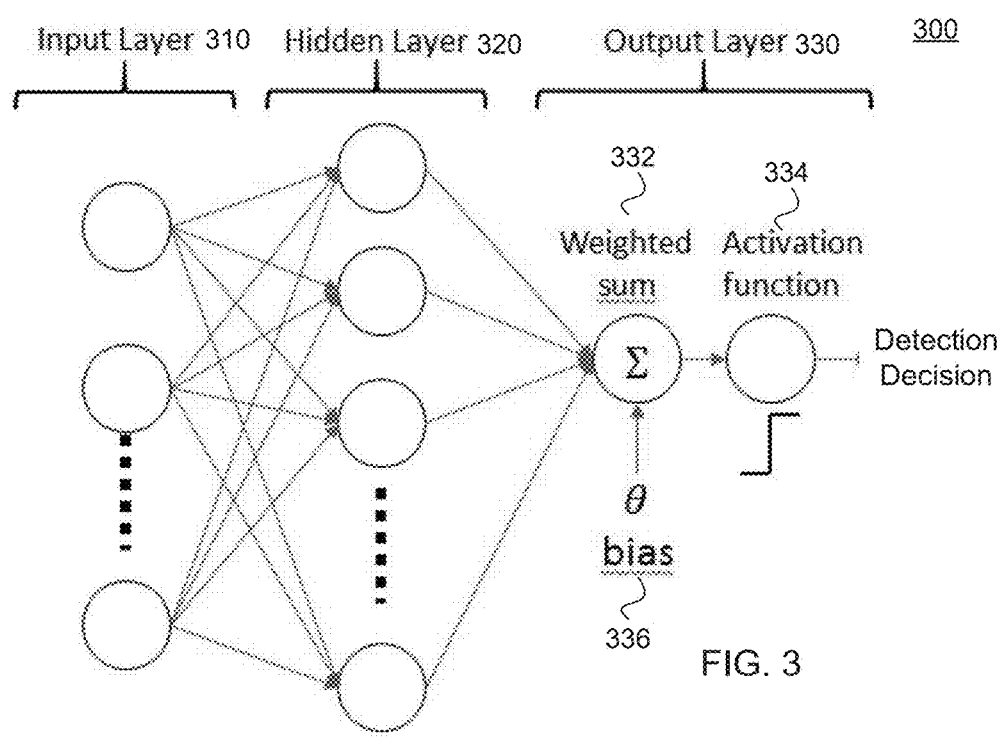
FIG. 3 is a block diagram of architecture for employing a neural network to detect presence using channel properties data collected from a wireless device, according to various embodiments.

FIG. 3 is a block diagram of architecture 300 for employing a neural network to detect presence using channel properties data (e.g., RSSI, CSI) collected from a wireless device, according to various embodiments. The architecture 300 for one of the disclosed neural networks (NN) 158 may include an input layer 310, a hidden layer 320, and an output layer 330. The input layer 310 may apply, for example, a separability function to collected data to separate channel properties according to multiple frequencies over a time period during which the channel properties were received.

More specifically, the separability function may separate the channel properties associated with a first group of frequencies from channel properties associated with a second group of frequencies over a time period, and so on through channel properties received from additional nodes, to generate a set of input variables to the NN. The multiple frequencies may be arrayed within a vector, $\vec{f}$, and associated with a corresponding time vector, $\vec{t}$, for purposes of algorithmic processing, as will be discussed in more detail.

In various embodiments, the hidden layer 320 may apply weights ($w_i$), which have been previously learned during NN training, to respective input variables of the set of input variables. The application of these weights ($w_i$) may weigh separated channel properties embodied within the input variables being processed by the NN 300, and thus generate weighted data values associated with the channel properties corresponding to the multiple frequencies.

The output layer 330, in one embodiment, may calculate a weighted sum 332 by combining the weighted data values from the hidden layer 320, and optionally applying any bias ($\theta$) 336 or offset, which is dependent on the training dataset (i.e. the channel environment). The weights ($w_i$) may be learned using a learning algorithm (e.g., machine learning), whether supervised or unsupervised. The output layer 330 may complete the detection by applying a detection activation function 334 to the weighted sum, which as illustrated may be a step-wise function, such that an output value from the activation function being greater than zero results in presence detection. In computational networks, the activation function of a node defines the output of that node given an input or set of inputs. The continuous real numbered input set is transferred into binary valued output 0 or 1, which denotes the binary classes (e.g. the presence or idleness of a room)

With additional reference to FIG. 3, the computing device 150 (FIG. 1) may employ a NN set of algorithms to detect passive human presence with a wireless TX and a wireless RX, e.g., with one TX-RX link. In one embodiment, the computing device 150 utilizes the channel properties data provided by the receiver's wireless module, e.g., of the RF modules 286 (FIG. 2B). Given CSI as merely exemplary, wireless devices may acquire either the instantaneous CSI or its second order statistics of CSI during their regular operation, e.g., statistical channel properties. In a short time, there are many samples of instantaneous CSIs (i.e. instantaneous channel properties). When the room is idle, the channel properties are stationary so the variation of instantaneous CSIs is small. However, if the human is present in the room, the wireless propagation channel may be disturbed by the human behavior that is varying in a short time. For this reason, the variation of sampled instantaneous CSIs is varying quickly in a short time. Based on this underlying principle, the covariance of sampled CSI of multiple frequencies over a time period is large in the presence of human and small in an idle room. Accordingly, statistical channel properties may be the covariance of channel properties over a time period.

In one embodiment, if only the statistical CSI is available, then the input layer 310 of the neural network may be defined as:

$$\vec{x} = \text{Vec}(\text{Cov}(H(\vec{f}, \vec{t}))) \tag{1}$$

where $H(\vec{f}, \vec{t})$ is the CSI acquired for the group of frequencies within vector $\vec{f}$ over a time period within vector $\vec{t}$, the Cov( ) function estimates the covariance, and Vec( ) performs a column stacking function to vectorize the covariance to contain the channel properties data associated with the group of frequencies, thus generating a group of separated data for NN processing. A column stacking function may be performed on a series of matrices, each matrix containing statistical channel properties data, to generate an input vector to the NN. If, however, the instantaneous CSI is also available, then the input layer may be given by $$\vec{x} = \phi(H(\vec{f}, \vec{t})) \tag{2}$$

where the $\phi( )$ is a separability function selected to optimize data separability, e.g., separate channel properties data according to multiple distinct frequencies located in the frequency vector, $\vec{f}$.

For both cases, the output layer may be calculated as $$y = \sum_{i=1}^{N} w_i x_i + \theta \tag{3}$$

where N is the number nodes in the hidden layer 320 for which the weighted sum 332 is applied, $\theta$ is the bias term, and the $w_i$ are the weights applied within the hidden layer(s) 320 that were previously trained using the training data 160. Using supervised learning, the computing device 150 may apply a perceptron algorithm to the training data 160 according to pre-trained classifiers 162. In one embodiment, the computing device 150 may further update the training of the pre-trained classifiers 162 based on updated training data from channel properties received from the RX and possibly also the TX.

At the output layer 330, the computing device executing the NN may determine that the null hypothesis of the target is present in the area of interest via the activation function 334 (e.g., a step function) of $$H_0 = \text{sign}(y), \tag{4}$$

where $H_0=1$ indicates a target is present, e.g., a human person of interest. Accordingly, a value of $H_0$ over zero may be indicative of human presence. The computing device may then generate a detection indicator that may be sent to either of the RX or TX wireless devices.

In an alternative embodiment, when employing unsupervised learning as a basis for training the NN simultaneously with applying the NN to channel properties data, the computing device 150 may perform expectation maximization for a multivariate Gaussian mixture model given by $$\phi = \{P(G_i), \mu_i, \Sigma_i\}_{i=0}^{k} \tag{5}$$

where $P(G_1)$ is the probability of mixture, i, with the distribution $P(X|G_i) \sim N(\mu_i, \Sigma_i)$, where i=0 indicates an idle room and i=1, ..., k indicates when the target (e.g., target person) is in room, i. Furthermore, the expression $L_C(\phi|X,Z)$ is the complete likelihood of the model $\phi$ with respect to observed variables X and hidden variables Z.

The unsupervised learning may be performed for the expectation maximization algorithm by estimating a plurality of weights of model states via initial guesses for the parameters $\{P(G_i), \mu_i, \Sigma_i\}$. After estimating these parameters, the computing device 150 may perform an expectation step given by $$Q(\phi|\phi^t) = E[L_C(\phi|X,Z), \phi^t]. \tag{6}$$

This expectation step may be followed by a maximization step given by:

$$\phi^{l+1} = \operatorname*{argmax}_{\phi} Q(\phi \mid \phi^l). \qquad (7)$$

The decision maximum likelihood may be expressed as $x_t \in G_n$ if $\operatorname{argmax}_i P(G_i|x_t) = n$.

Figure 4A:
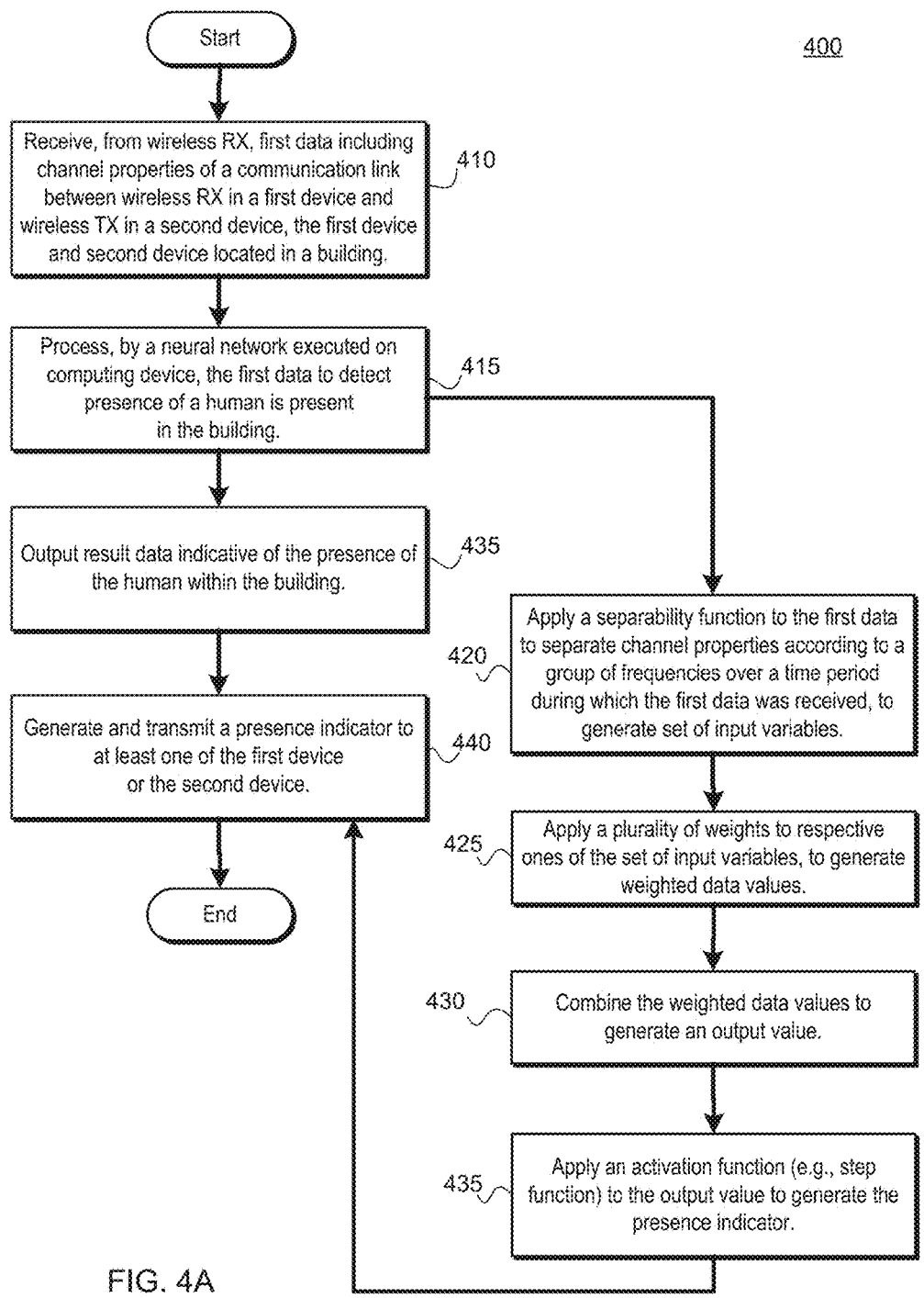
FIG. 4A is a flow diagram of a method for detecting presence in a building of a human using neural network processing on radio frequency (RF) channel properties received by a wireless receiver (RX), according to various embodiments.

FIG. 4A is a flow diagram of a method 400 for detecting presence in a building of a human using neural network processing on RF channel properties received by a wireless receiver (RX), according to various embodiments. Method 400 may be performed by processing logic that may comprise hardware (e.g., circuitry, dedicated logic, programmable logic, microcode, etc.), software (such as instructions running on the processor), firmware or a combination thereof. In one embodiment, a processor of the computing device 150 or the wireless device 200 performs the method 400. Alternatively, other components of the user device may perform some or all of the operations of the method 400.

The method 400 may begin with processing logic receiving, from a wireless RX, first data indicative of channel properties of a first communication link between the wireless RX in a first device and a wireless transmitter (TX) in a second device, the first device and the second device being located in a building having one or more rooms (410). The method 400 may continue with processing, by a neural network executed by the processing logic, the first data to detect presence of a human in the building (415). The method 400 may continue with the processing logic outputting result data indicative of the presence of the human within the building (435). The method 400 may continue with the processing logic generating and transmitting a presence indicator, indicative of the presence of the human, to at least one of the first device or the second device (440). In one embodiment, the result data includes the presence indicator, such that the first device and/or second device are informed of the presence.

In various embodiments, the neural network applies a set of algorithms to the data to distinguish the human from pre-existing or stationary objects within the building. In one embodiment, the method 400 continues from block 415 with the processing logic applying a separability function to the first data, to separate the channel properties according to a group of frequencies that carried the first data over a time period during which the wireless RX received the first data, thus generating a set of input variables (420). The method 400 continues with the processing logic applying a plurality of weights to respective ones of the set of input variables, to generate weighted data values (425). The method 400 may continue with the processing logic combining the weighted data values to generate an output value (430). The method 400 may continue with the processing logic applying a detection activation function to the output value to generate the presence indicator (435). In one embodiment, the detection activation function comprises a step function, which activates the presence indicator for values output from the activation function that are greater than zero.

Figure 4B:
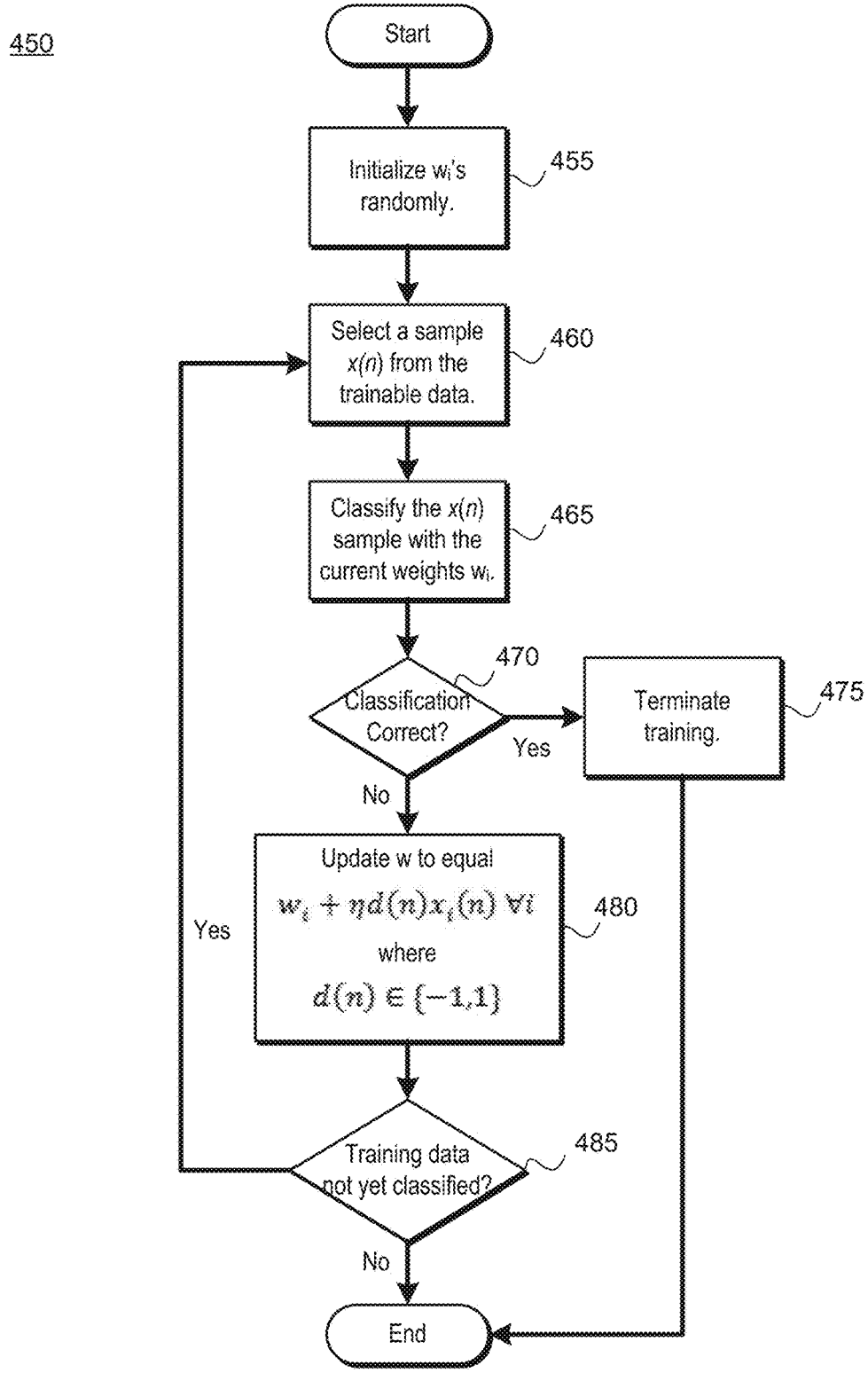
FIG. 4B is a flow diagram of a method for learning the weights of the neural network discussed with reference to FIGS. 4A and 7A-7B, according to various embodiments.

FIG. 4B is a flow diagram of a method 450 for learning the weights $w_i$ of the neural network discussed with reference to FIG. 4A and FIGS. 7A-7B with a perceptron algorithm, according to various embodiments. A perceptron algorithm with reference to artificial neural networks is an algorithm used for pattern recognition, e.g., in an effort to properly classify new training data as either an object in a building or a human present within the building. Method 450 may be performed by processing logic that may comprise hardware (e.g., circuitry, dedicated logic, programmable logic, microcode, etc.), software (such as instructions running on the processor), firmware or a combination thereof. In one embodiment, a processor of the computing device 150 or the wireless device 200 performs the method 450. Alternatively, other components of the user device may perform some or all of the operations of the method 450.

In various embodiments, the weights ($w_i$) are learned from the labeled training data with the perceptron algorithm and in relation to the architecture 300 of the neural network. With reference to FIG. 4B, the method may begin with the processing logic initializing $w_i$'s randomly, e.g., randomly selecting starting values for each $w_i$ (455). The method 450 may continue with the processing logic selecting a sample, x(n), from the training data received from the receiver (460). The method 450 may continue with the processing logic classifying the x(n) sample with the current weights $w_i$ (465). The method 450 may continue with the processing logic determining whether the classification of the x(n) is correct, e.g., by way of comparison with predetermined labels of labeled training data (470). If the classification is correct, the method 450 may continue with the processing logic terminating training for the received training data (475).

With continued reference to FIG. 4, if the classification is not correct as determined at block 470, the method 450 may continue with the processing logic updating w (e.g., the current weight $w_i$ for the sample x(n)) to be equal to $$w_i + \eta d(n) x_i(n) \forall i. \qquad (8)$$

where $d(n) \in \{-1, 1\}$ is the output range (480). The method 450 may continue with the processing logic determining whether there is still unclassified training data remaining (485). If not, the method 450 may terminate; otherwise, the method 450 may continue with the processing logic looping back to selecting a new sample x(n) of CSI from the training data received from the receiver (460), to continue with training the NN with the training data. As discussed with reference to FIG. 3, these trained weights ($w_i$) may then be used in combination with the CSI data and any bias term to generate an output as a weighted sum, which may then be passed through a detection activation function to determine whether or not a presence is detected.

In various embodiments, once presence is detected, the computing device 150 may send a presence detection signal to one or both of the RX and TX (e.g., the wireless device 200) in the premises of the monitored building. Furthermore, the wireless device 200 that receives the presence detection signal may perform a predetermined or programmed action. For example, if associated with a home security or automation system, the wireless device 200 may sound an alarm or send an intrusion detection signal to law enforcement if the presence is unanticipated. If the presence is anticipated, the wireless device 200 may start streaming a certain kind of music or perform other follow-me services in conjunction with Internet-of-things devices. For example, the follow-me services may include turning on lights in rooms where the person goes, starting a program on a television (e.g., the next of the series on a streaming service) in that room, passing the music into additional room, or starting a pot of coffee or the like for the person.

By way of experiment with reference to presence detection within the room 101 shown in FIG. 1, the results in the Table 1 illustrate the effectiveness, on a RX location basis, of the neural network (NN) method (integrated with CSI)

compared to use of just CSI and to other RSSI-related methods, which include RSSI, differential RSSI, and entropy. In this experiment, the room 101 measured length ($D_1$) as 30 feet and width ($D_2$) as 14 feet.

TABLE 1

|       | NN   | RSSI | diff-RSSI | Entropy | CSI  |
|-------|------|------|-----------|---------|------|
| RX #1 | 99%  | 88%  | 99%       | 77%     | 99%  |
| RX #2 | 99%  | 90%  | 96%       | 68%     | 98%  |
| RX #3 | 97%  | 59%  | 56%       | 13%     | 98%  |
| RX #4 | 100% | 95%  | 94%       | 82%     | 100% |

Figure 5A:
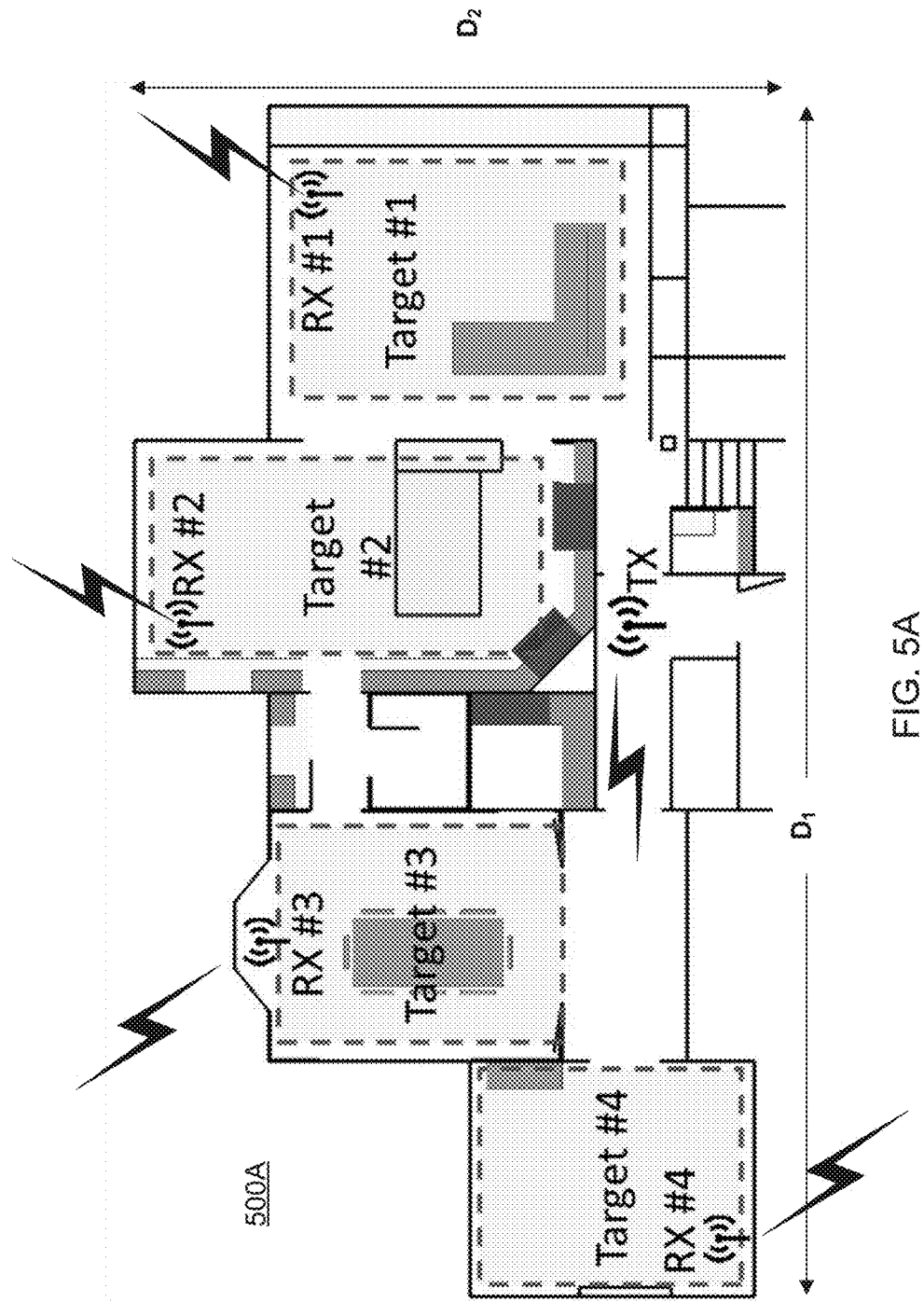
FIG. 5A illustrates an example set of rooms in a building, each room including a particular target to be detected and an in-room receiver, according to various embodiments.

FIG. 5A illustrates an example set of rooms in a building 500, each room including a particular target to be detected, according to various embodiments. The rooms may be identified herein according to receiver (RX) or target number. In this experiment, the target to be detected is not a human person but a predetermined object located at differing locations with reference to the receiver that was in a correspondingly-numbered room. This provides an indication of differing levels of effectiveness depending on mutual locations and what type of method was used for detection, including the detection of targets through walls in different parts of the building 500. Note that although rooms are referred to, a building may of course have a relatively open constructions style with few walls, and thus few "rooms." Accordingly, the term "rooms" may also be understood to refer to portions or areas within a building, where receivers and transmitters may be distributed throughout an open space.

As can be seen in Table 2, the decision based on RSSI requires at least one node in each room, CSI and NN perform better for the cases when either a transmitter or a receiver is in the same room with the target, and NN learning with CSI overall has the best coverage. In this particular experiment, the building measured length ($D_1$) as 71 feet and width ($D_2$) as 40 feet, including four different rooms, some inner stairwell space, and other closet space.

TABLE 2

| RX # | Target # | NN    | RSSI  | diff-RSSI | Entropy | CSI   |
|------|----------|-------|-------|-----------|---------|-------|
| 1    | 1        | 93.5% | 81.5% | 90.5%     | 92.0%   | 93.5% |
| 1    | 2        | 74.5% | 62.5% | 67.5%     | 71.5%   | 77.0% |
| 1    | 3        | 66.0% | 50.5% | 50.0%     | 56.5%   | 55.0% |
| 1    | 4        | 73.5% | 51.5% | 50.0%     | 51.5%   | 52.0% |
| 2    | 1        | 80.5% | 69.5% | 69.0%     | 51.5%   | 83.5% |
| 2    | 2        | 93.0% | 80.0% | 83.0%     | 69.5%   | 93.5% |
| 2    | 3        | 79.0% | 50.5% | 50.5%     | 31.0%   | 56.5% |
| 2    | 4        | 93.0% | 51.5% | 50.0%     | 48.5%   | 47.5% |
| 3    | 1        | 53.5% | 50.5% | 50.5%     | 56.0%   | 54.5% |
| 3    | 2        | 72.0% | 50.5% | 51.5%     | 57.0%   | 55.0% |
| 3    | 3        | 98.0% | 73.0% | 84.5%     | 93.5%   | 95.5% |
| 3    | 4        | 71.5% | 52.5% | 52.0%     | 61.5%   | 61.0% |
| 4    | 1        | 62.0% | 50.0% | 50.0%     | 43.0%   | 54.5% |
| 4    | 2        | 71.0% | 50.5% | 50.0%     | 39.5%   | 59.0% |
| 4    | 3        | 68.0% | 67.0% | 72.0%     | 68.5%   | 73.5% |
| 4    | 4        | 94.0% | 84.5% | 94.0%     | 85.5%   | 90.0% |

With continued reference to FIG. 5A, Table 3 illustrates a closer inspection of results with use of a neural network (NN) approach using CSI-based data. Table 3 illustrates, along the diagonal (in bold), the NN detection results when the RX and the target are in the same room. Note that the NN performs better than 93% if the target and the RX are in the same room. The results illustrated in Table 3 that are off the diagonal illustrate a percentage of detection success when the RX was in a different room from the detected target. Even when the target and the RX are at opposite sides of the building 500, the NN can still achieve more than 70% accuracy (e.g., RX1 detecting target 4 at 73.5% of the time). By utilizing multiple TX-RX links simultaneously (e.g., together during the same training), one can significantly improve the detection rate throughout a home or other building.

TABLE 3

|    | Target |       |       |       |
|----|--------|-------|-------|-------|
| RX | 1      | 2     | 3     | 4     |
| 1  | 93.5% | 74.5% | 66.0% | 73.5% |
| 2  | 80.5%  | 93.0% | 79.0% | 93.0% |
| 3  | 53.5%  | 72.0% | 98.0% | 71.5% |
| 4  | 62%    | 71%   | 68%   | 94%   |

Figure 5B:
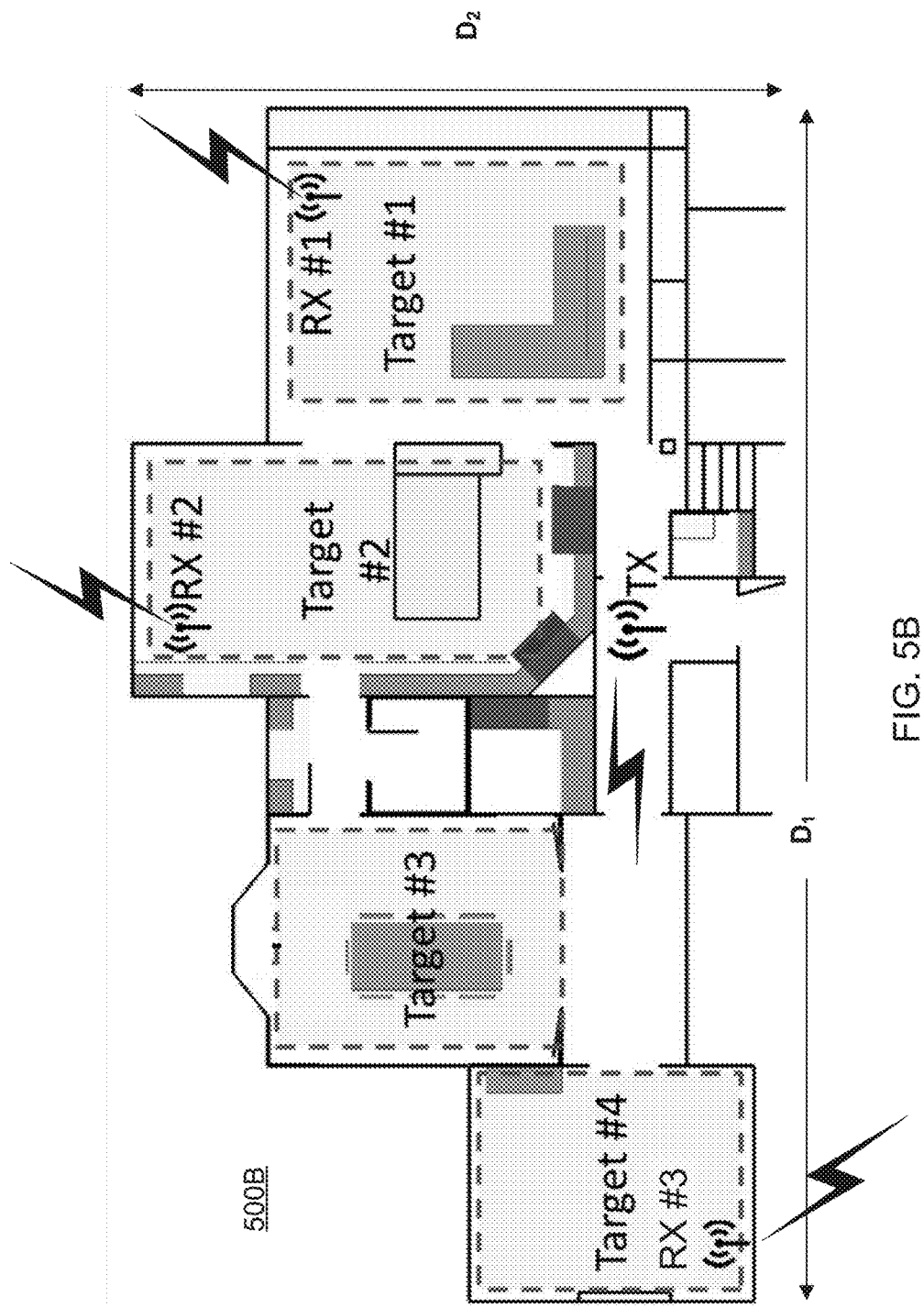
FIG. 5B illustrates the example set of rooms of FIG. 5A, but where not all of the rooms include a receiver, according to one embodiment.

FIG. 5B illustrates the example set of rooms of FIG. 5A, but where not all of the rooms include a receiver. Note that even though there is no longer a receiver within the same room with Target #3, that the other receivers (RX #1, #2, and #3) may receive data used to detect presence of Target #3. These other receivers (RX #1, #2, and #3) may receive data to detect Target #3, where the data includes channel properties received related to wireless signals that have passed through the walls and passages of the building and reflected and refracted into these other receivers (RX #1, #2, and #3). Accordingly, the presence may still be detected if a human is within wireless range of any receiver, and may be associated with the closest of the receivers (RX #1, #2, and #3). This means that not only does a human not need to be actively tagged to detect that person, but the disclosed embodiments may detect the presence of that human without even having a receiver or other sensor in the same room. This is a distinct advantage over those current systems that required motion sensors or the like that only work within the room or space in which they are placed due to reliance on line of sight for detection.

Figure 6:
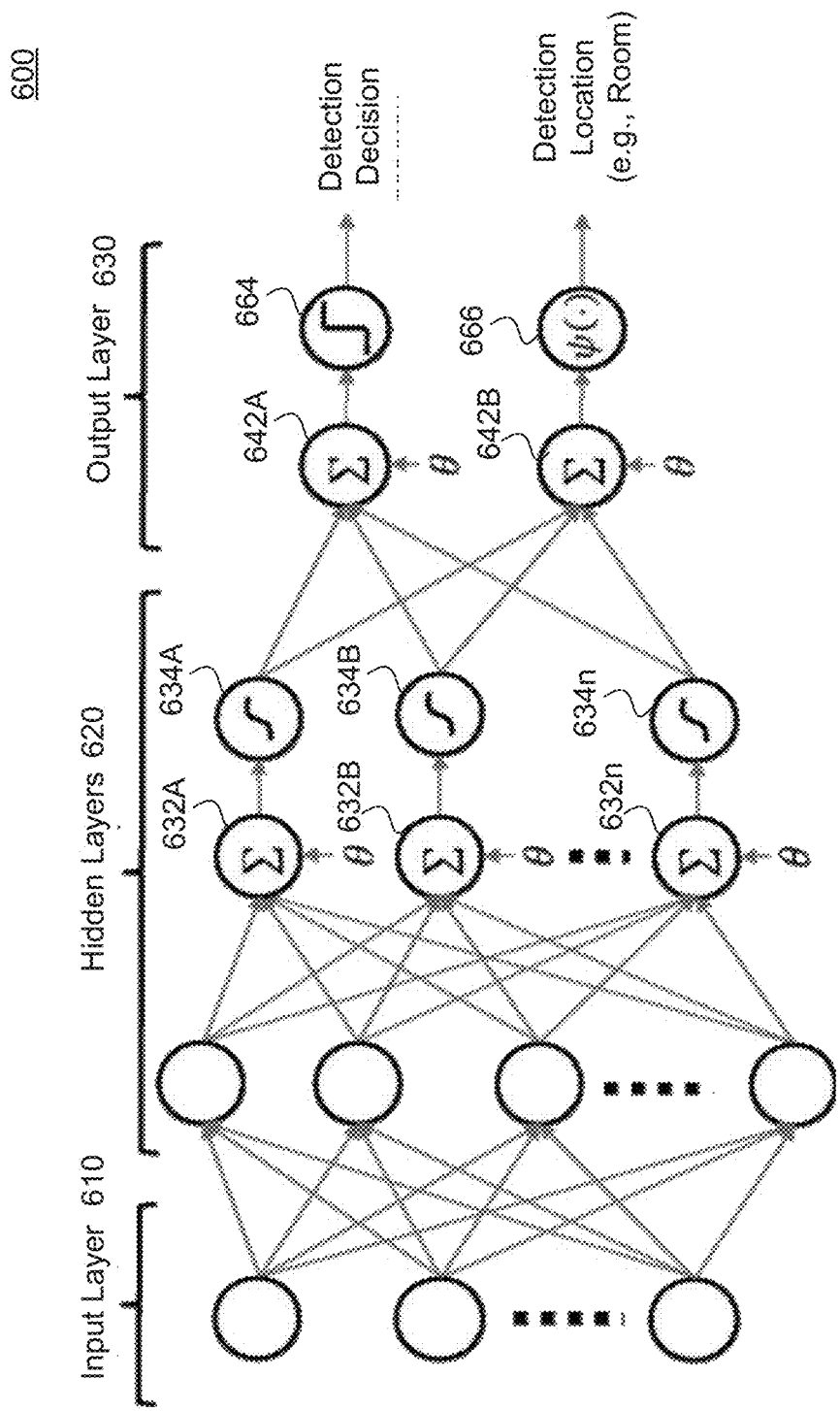
FIG. 6 is a block diagram of architecture for a neural network to be employed to detect presence and location using data, including channel properties, collected from at least two transmitter and receiver pairs of wireless devices, according to various embodiments.

FIG. 6 is a block diagram of architecture 600 for a neural network to be employed to detect presence and location using data, including channel properties, collected from at least two transmitter and receiver pairs of wireless devices, according to various embodiments. If the channel properties from more than one wireless TX-RX pairs are available, then a multi-layer NN can be used not only to detect passive human presence, but also to determine the relative location of the target with respect to the wireless nodes (whether TX or RX nodes). For example, the computing device 150 may receive, from a first wireless RX and a second wireless RX that are located in a building, data that includes first channel properties in a first communication link between a wireless TX and the first wireless RX and second channel properties in a second communication link between the wireless TX and the second wireless RX. As discussed, the channel properties may represent wireless signal propagation characteristics of wireless signals being transmitted within the building.

The architecture 600 of FIG. 6 extends on the architecture 300 (FIG. 3) and similarly includes an input layer 610, one or more hidden layers 620, and an output layer 630. The input layer 610 of the NN architecture 600 of FIG. 6 may be expressed as:

$$\vec{x} = \phi([H_1(\vec{f}, \vec{t}), H_2(\vec{f}, \vec{t}), \ldots, H_K(\vec{f}, \vec{t})]) \quad (9)$$

where K is the number of TX-RX links, and thus acts as a separability function applied to at least the first channel properties and the second channel properties within nodes of the input layer 610. The separability function may separate the channel properties associated a first group of frequencies from channel properties associated with a second group of frequencies over the time period, and so on through channel properties received from additional nodes, to generate input variables to the NN. As discussed, these groups of frequencies may be carried with a vector of the frequencies, f, and associated with a corresponding vector of time, $\vec{t}$, over the time period, for purposes of NN processing. Multiple hidden layers 620 may be employed to process the input variables from the input layer 610. For example, a first hidden layer may apply multiple weights to respective input variables to calculate a summed output:

$$y_{1,k} = \sum_{i=1}^{N_{hidden}} w_{1,k,i} x_{1,i} + \theta_k \quad \forall k0 < k \leq K, \qquad (10)$$

where $y_{1,k}$ is a summation of multiple weighted variables, one for each of the K nodes, for a given hidden layer 620. So, a first weighted variable (from a weighted first input variable) may be added to a second weighted variable (from a weighted second input variable) to generate the summed output.

Accordingly, the multiple summers 631A, 632B . . . 632n may represent integration of various trained weights for each TX-RX link, generating the $y_{1,k}$ summed output. In one embodiment, the weights ($w_{1,k,i}$, $w_{2,n,i}$) may have been previously trained through application of a perceptron algorithm with back-propagation and in view of pre-trained classifiers, which may training or labeled data used for training. The training may be performed with the computing device 150 executing supervised learning, which methods were discussed in detail previously. In one embodiment, the supervised learning is based on data captured from the building indicative of an initial state of a topology of the building without humans.

Then, by applying a sigmoid activation function 634A, 634B . . . 634n to the summed output, $y_{1,k}$, the input of a second of the hidden layers 620 may be determined as:

$$x_{2,k} = \frac{1}{1 + e^{-y_{1,k}}} \quad \forall k0 < k \leq K, \qquad (11)$$

which may also be referred to as intermediate output value(s) that becomes a new input variable to a second hidden layer within the hidden layers 620. The sigmoid activation function may map all possible $y_{1,k}$ values to the interval of [0,1], which can also be interpreted as the likelihood of the target being close to a kth node. The sigmoid activation function works well in a NN in taking, as an input values, any real numbers, and returning an output value that monotonically increases between two values, for example, between zero ("0") and ("1"). The second hidden layer may then process the intermediate output value(s) output by the sigmoid activation function using Equation (10), to generate further intermediate output values.

The computing device 150 may then combine intermediate output value(s) from the hidden layers 620 using multiple summers 624A, 624B, to generate a final output value for deciding whether presence has been detected, and if so, a possible location of a human target. More specially, an algorithm in the output layer 630 for determining a final output value may be expressed as:

$$y_{2,k} = \sum_{i=1}^{K} w_{2,n,i} x_{2,i} + \theta \quad \forall k0 < n \leq N_{outputs}. \qquad (12)$$

In other words, this final output value is the summation of a combination of an additional multiple weights, $w_{2,n,i}$, one for each node, and corresponding intermediate output value(s), $x_{2,i}$, along with a possible biasing term, $\theta$, as expressed in Equation (12).

The NN may then determine the null hypothesis of the target is present in the area of interest via a detection activation function 664 (e.g., a step function) applied to the final output value, which may be expressed as:

$$H_0 = \text{sign}(y_{2,1}), \qquad (13)$$

where $H_0 = 1$ indicates a target (e.g., a human) is present. Other detection activation functions may also be employed. In addition, the relative location of the target may be determined by a locator function 666 applied to the final output value, which may be expressed as:

$$\text{loc}_{id} = \psi(y_{2,2}) \qquad (14)$$

where $\psi( )$ is a function trained or derived from labeled training data. The locator function 666 may generate a location indicator of a location of a human detected within the building. The locator function is a logistic transfer function which outputs finite classes (e.g., room number in a house or the partition of a building) depending on the input vector, which is the output of the hidden layer nodes 634A-634N.

Accordingly, the location indicator is associated with a closest wireless RX or wireless TX to the human (e.g., take on a name associated with the room in which the closest wireless RX or wireless TX is located and which devices are similarly named). This location indicator may be transmitted to the closest wireless RX or wireless TX so that the closest wireless RX or wireless TX may take predetermined action depending on programming and context provided with the presence detection and the location determination. These possible applications were discussed previously such performing security-related, home-automation-related functions, or Internet-of-things (IOT)-related in response to receipt of the location indicator. In various embodiments, the weights $w_{1,k,i}$ $w_{2,n,i}$ and the function $\psi( )$ may be obtained with a perceptron learning algorithm with back-propagation in view of pre-trained classifiers.

Figure 7A:
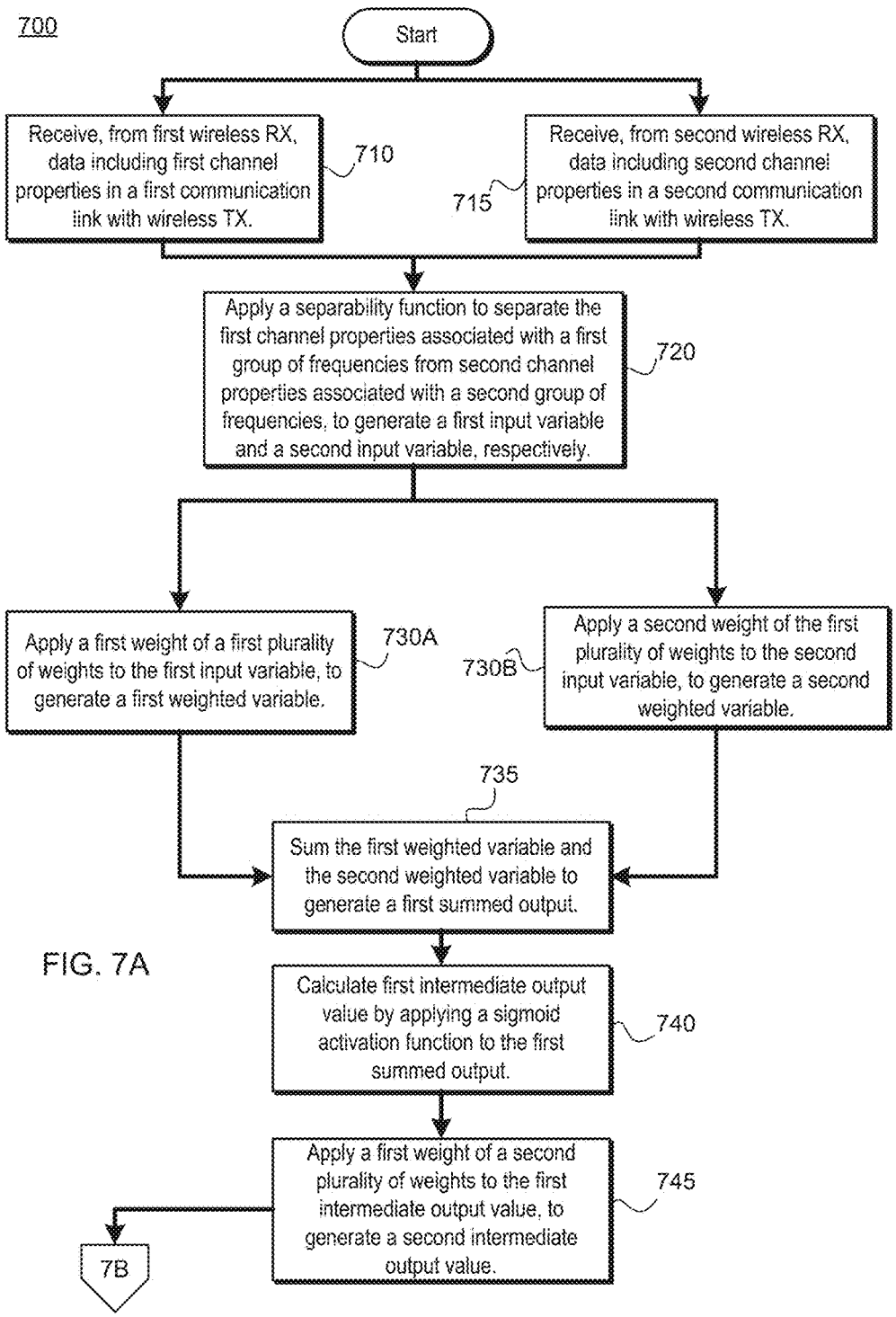
FIGS. 7A and 7B are a flow diagram of a method for detecting presence or location of a human in a building using neural network processing of channel properties received by a pair of receivers from at least one transmitter, according to various embodiments.
Figure 7B:
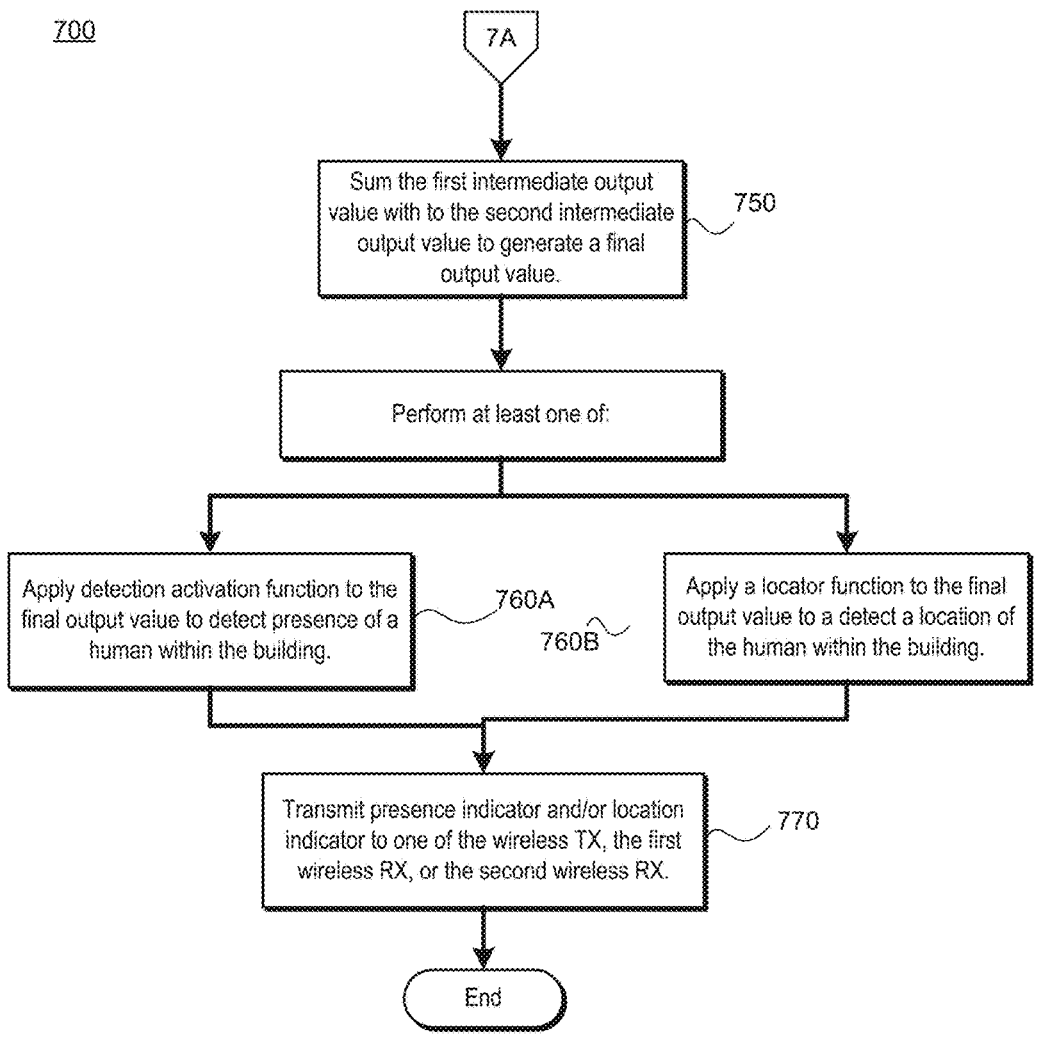

FIGS. 7A and 7B are a flow diagram of a method 700 for detecting presence or location of a human in a building using neural network (NN) processing of channel properties received by a pair of receivers from at least one transmitter, according to various embodiments. Method 700 may be performed by processing logic that may comprise hardware (e.g., circuitry, dedicated logic, programmable logic, microcode, etc.), software (such as instructions running on the processor), firmware or a combination thereof. In one embodiment, a processor of the computing device 150 or the wireless device 200 performs the method 700. Alternatively, other components of the user device may perform some or all of the operations of the method 700.

With further reference to FIG. 7A, the method 700 may begin with the processing logic receiving, from a first wireless receiver (RX) located in a building, data that includes first channel properties in a first communication link between a wireless transmitter (TX) and the first wireless RX that existed during a time period (710). The method 700 may continue with the processing logic receiving second channel properties in a second communication link between the wireless TX and the second wireless RX that existed during the time period (715). In one embodiment, channel properties represent wireless signal propagation characteristics of wireless signals being transmitted within the building. The method 700 may continue with the processing logic applying, in an input layer of a neural network, a separability function to the data to separate the first channel properties associated with a first group of frequencies from the second channel properties associated with a second group of frequencies, to generate a first input variable and a second input variable, respectively, to a multi-layered neural network (720). In one embodiment, the separability function is selected to optimize data separability of the first channel properties from the second channel properties, and according to the groups of frequencies for each of the first channel properties and the second channel properties.

The method 700 may continue with the processing logic, within a first hidden layer, applying a first weight of a plurality of weights to the first input variable, to generate a first weighted variable (730A), and applying a second weight of the plurality of weights to the second input variable, to generate a second weighted variable (730B). The method 700 may continue with the processing logic summing the first weighted variable and the second weighted variable to generate a first summed output (740). This output is referred to as a summed output by virtue of application of Equation (10), where the weighted frequencies are summed. The method 700 may continue with the processing logic calculating, a first intermediate output value by applying a sigmoid activation function to the first summed output (740). In one embodiment, the sigmoid activation function maps the first summed output to an interval between zero and one. The method 700 may continue with the processing logic applying a third weight (or a first weight of a second plurality of weights) to the intermediate output value, to generate a second intermediate output value (745). The second intermediate output value may be generated in conjunction with a second hidden layer, and additional intermediate outputs may be generated for more nodes (e.g., RX-TX pairs) and for additional hidden layers of the multi-layered NN.

With further reference to FIGS. 6 and 7B, the method 700 may continue, within an output layer of the NN, with the processing logic summing the first intermediate output value, the second intermediate output value, and any additional intermediate output values (from further RX-TX pairs and across one or more additional hidden layers), to generate a final output value (750). The method 700 may continue with the processing logic performing at least one of the following, e.g., applying a detection activation function (e.g., a step function) to the final output value to detect presence of a human within the building (760A) and applying a locator function to the final output value to detect a location of the human within the building (760B). The location may include a location indicator associated with a closest of the first wireless RX and the second wireless RX to the location. The method 700 may continue with the processing logic transmitting a presence indicator (from block 760A) or the location indicator (form block 760B) to at least one of the first wireless RX, the second wireless RX, or the wireless TX (770).

Figure 8:
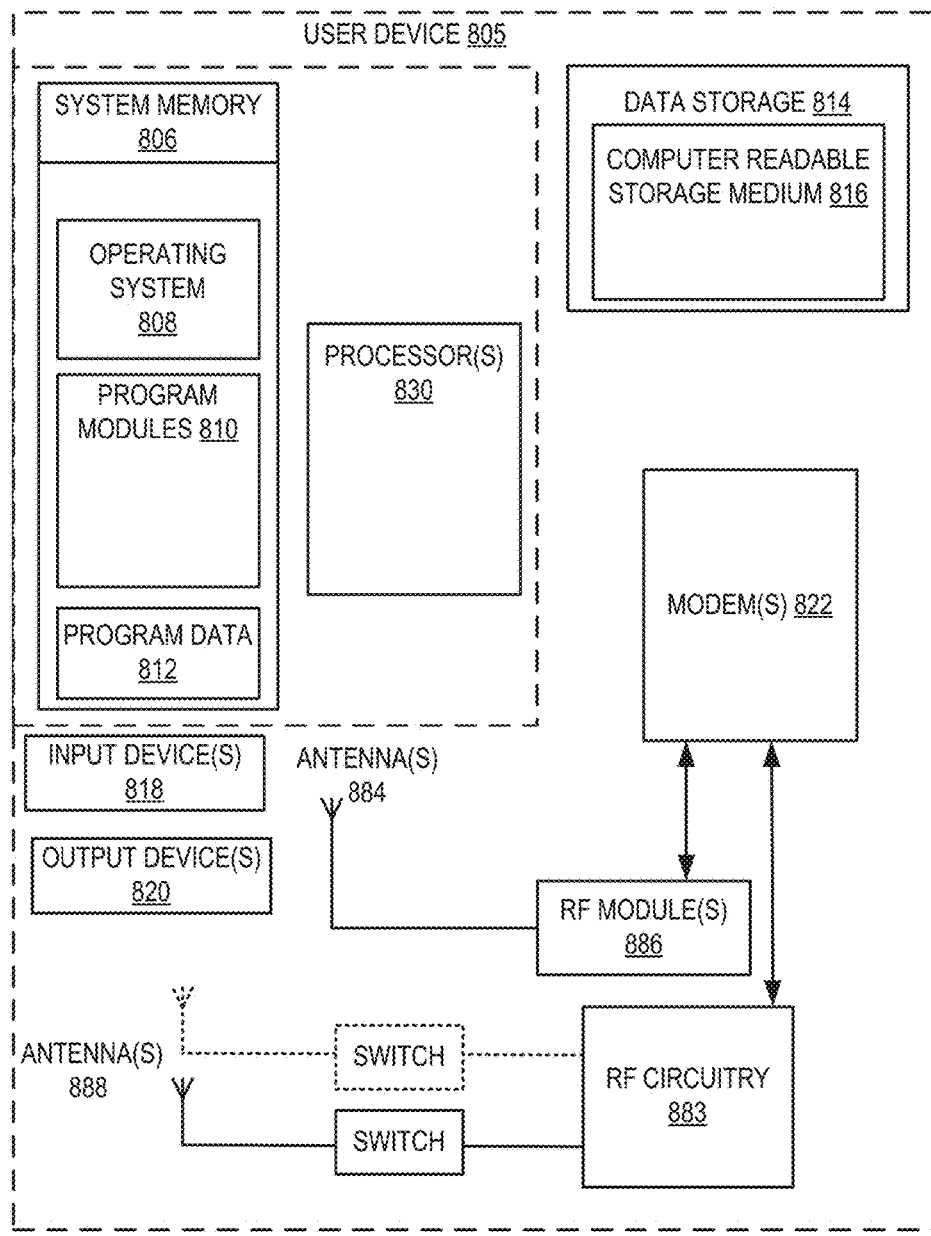
FIG. 8 is a block diagram of a user device in which embodiments of capturing CSI and RSSI for neural network processing may be implemented.

FIG. 8 is a block diagram of a user device 805 in which embodiments of capturing CSI and RSSI for neural network processing may be implemented. The user device 805 may correspond to the RX wireless devices 104A, 104B, 104C, 104D or TX wireless device 102 of FIG. 1, the computing device 150 of FIG. 1, or the wireless device 200 of FIGS. 2A and 2B. The user device 805 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 805 may be any portable or stationary user device. For example, the user device 805 may be an intelligent voice control and speaker system. Alternatively, the user device 805 can be any other device used in a WLAN network (e.g., Wi-Fi® network), a WAN network, or the like.

The user device 805 includes one or more processor(s) 830, such as one or more CPUs, microcontrollers, field programmable gate arrays, or other types of processors. The user device 805 also includes system memory 806, which may correspond to any combination of volatile and/or non-volatile storage mechanisms. The system memory 806 stores information that provides operating system component 808, various program modules 810, program data 812, and/or other components. In one embodiment, the system memory 806 stores instructions of the methods 400, 440, and 700 as described herein. The user device 805 performs functions by using the processor(s) 830 to execute instructions provided by the system memory 806.

The user device 805 also includes a data storage device 814 that may be composed of one or more types of removable storage and/or one or more types of non-removable storage. The data storage device 814 includes a computer-readable storage medium 816 on which is stored one or more sets of instructions embodying any of the methodologies or functions described herein. Instructions for the program modules 810 may reside, completely or at least partially, within the computer-readable storage medium 816, system memory 806 and/or within the processor(s) 830 during execution thereof by the user device 805, the system memory 806 and the processor(s) 830 also constituting computer-readable media. The user device 805 may also include one or more input devices 818 (keyboard, mouse device, specialized selection keys, etc.) and one or more output devices 820 (displays, printers, audio output mechanisms, etc.).

The user device 805 further includes a modem 822 to allow the user device 805 to communicate via a wireless network (e.g., such as provided by the wireless communication system) with other computing devices, such as remote computers, an item providing system, and so forth. The modem 822 can be connected to RF circuitry 883 and zero or more RF modules 886. The RF circuitry 883 may be a WLAN module, a WAN module, PAN module, or the like. Antennas 888 are coupled to the RF circuitry 883, which is coupled to the modem 822. Zero or more antennas 884 can be coupled to one or more RF modules 886, which are also connected to the modem 822. The zero or more antennas 884 may be GPS antennas, NFC antennas, other WAN antennas, WLAN or PAN antennas, or the like. The modem 822 allows the user device 805 to handle both voice and non-voice communications (such as communications for text messages, multimedia messages, media downloads, web browsing, etc.) with a wireless communication system. The modem 822 may provide network connectivity using various types of mobile network technology including, for example, cellular digital packet data (CDPD), general packet radio service (GPRS), EDGE, universal mobile telecommunications system (UMTS), 1 times radio transmission technology (1xRTT), evaluation data optimized (EVDO), high-speed down-link packet access (HSDPA), Wi-Fi®, Long Term Evolution (LTE) and LTE Advanced (sometimes generally referred to as 4G), etc., although not all of these mobile network technologies may be available.

The modem 822 may generate signals and send these signals to antenna 888, and 884 via RF circuitry 883, and RF module(s) 886 as descried herein. User device 805 may additionally include a WLAN module, a GPS receiver, a PAN transceiver and/or other RF modules. These RF modules may additionally or alternatively be connected to one or more of antennas 884, 888. Antennas 884, 888 may be configured to transmit in different frequency bands and/or using different wireless communication protocols. The antennas 884, 888 may be directional, omnidirectional, or non-directional antennas. In addition to sending data, antennas 884, 888 may also receive data, which is sent to appropriate RF modules connected to the antennas.

In one embodiment, the user device 805 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna building that operates at a first frequency band and the second wireless connection is associated with a second resonant mode of the antenna building that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 822 is shown to control transmission and reception via antenna (884, 888), the user device 805 may alternatively include multiple modems, each of which is configured to transmit/receive data via a different antenna and/or wireless transmission protocol.

The user device 805 delivers and/or receives items, upgrades, and/or other information via the network. For example, the user device 805 may download or receive items from an item providing system. The item providing system receives various requests, instructions and other data from the user device 805 via the network. The item providing system may include one or more machines (e.g., one or more server computer systems, routers, gateways, etc.) that have processing and storage capabilities to provide the above functionality. Communication between the item providing system and the user device 805 may be enabled via any communication infrastructure. One example of such an infrastructure includes a combination of a wide area network (WAN) and wireless infrastructure, which allows a user to use the user device 805 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by Wi-Fi® products based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the user device 805.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 805 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 805 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known buildings and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required building for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
  receiving, by a computing device from a first wireless receiver (RX), first channel properties for a first communication link between the first wireless receiver and a wireless transmitter (TX) that existed during a time period;
  receiving, by the computing device, from a second wireless RX, second channel properties for a second communication link between the second wireless RX and the wireless TX that existed during the time period, wherein the first and the second wireless RXs and the wireless TX are located in a building having multiple rooms, and wherein the first and second channel properties represent wireless signal propagation characteristics comprising a combination of scattering, fading, and power decay of wireless signals;
  separating, by the computing device, the first channel properties associated with a first group of frequencies from the second channel properties associated with a second group of frequencies, to generate a first input variable and a second input variable, respectively;
  processing, by the computing device executing a multi-layered neural network, the first input variable and the second input variable to generate at least a first intermediate output value and a second intermediate output value, wherein processing comprises applying a plurality of weights, from a trained classifier, to the first input variable and the second input variable;
  summing, by the computing device, the first intermediate output value and the second intermediate output value to generate a final output value;
  performing, by the computing device, presence detection through:
    applying a detection activation function to the final output value to generate a detection decision that indicates presence of a human within the building; and
    applying a locator function to the final output value to detect a relative location of the human within the building, wherein the relative location is with respect to a closest of the first wireless RX, the second wireless RX, and the wireless TX.

2. The method of claim 1, further comprising:
  generating a location indicator associated with the relative location of the human within the building; and
  transmitting the location indicator to the closest of the first wireless RX, the second wireless RX, or the wireless TX associated with the relative location to direct the closest of the first wireless RX, the second wireless RX, or the wireless TX to increase a sampling rate for corresponding channel properties.

3. The method of claim 1, wherein the receiving the first channel properties comprises receiving first channel state information (CSI) stored at a first device comprising the first wireless TX, and wherein receiving the second channel properties comprises receiving second CSI stored at a second device comprising the second wireless RX.

4. The method of claim 1, wherein the processing comprises:
  applying a first weight, of the plurality of weights, to the first input variable, to generate a first weighted variable, and a second weight, of the plurality of weights, to the second input variable, to generate a second weighted variable;
  summing the first weighted variable and the second weighted variable to generate a first summed output;
  calculating the first intermediate output value by applying a sigmoid activation function to the first summed output, wherein the sigmoid activation function maps the first summed output to an interval between zero and one; and
  applying, by the computing device, a third weight, of the plurality of weights, to the first intermediate output value, to generate the second intermediate output value.

5. A method comprising:
  receiving, by a computing device from a wireless receiver (RX), first data indicative of channel properties of a first communication link between the wireless RX in a first device and a wireless transmitter (TX) in a second device, the first device and the second device being located in a building;

processing, by a neural network executed by the computing device, the first data to distinguish humans from stationary objects within the building and detect presence of a human in the building, wherein the processing comprises:
  generating a set of input variables to the neural network by applying a separability function to the first data that separates the channel properties according to a group of frequencies;
  generating values for a first weighted variable by applying a first weight to a first input variable of the set of input variables and for a second weighted variable by applying a second weight to a second input variable of the set of input variables; and
  generating an output value of the neural network comprising a combination of the values for the first and the second weighted variables; and
transmitting, by the computing device to at least one of the first device or the second device, result data based on the output value, wherein the result data is indicative of the presence of the human in the building.

6. The method of claim 5, wherein the receiving the first data comprises receiving channel state information (CSI) stored at the first device, the second device, or both, and wherein the first data comprises CSI and received signal strength indicator (RSSI) values.

7. The method of claim 5, wherein the transmitting comprises:
  generating a presence indicator indicative of the presence of the human; and
  transmitting the presence indicator to the at least one of the first device or the second device, to direct the at least one of the first device or the second device to increase a sampling rate for the first data.

8. The method of claim 5, further comprising applying an activation function to the output value to generate a presence indicator indicative of the presence of the human, wherein the activation function comprises a step function, which activates the presence indicator for input values greater than zero.

9. The method of claim 5, wherein when the first data comprises statistical channel properties, the method further comprising:
  estimating, from the statistical channel properties, a covariance of the first data over the group of frequencies; and
  executing a column stacking function to vectorize the covariance to contain the first data and generate the set of input variables.

10. The method of claim 5, wherein the wireless RX is a first wireless RX and the channel properties are first channel properties, the method further comprising:
  receiving, from a second wireless RX in a third device, second data indicative of second channel properties of a second communication link between the second wireless RX in the third device and the wireless TX in the second device; and
  processing, by the computing device executing the neural network having multiple hidden layers, the first data and the second data to determine a relative location of the human present in the building with respect to a closest of the first wireless RX, the second wireless RX, and the wireless TX.

11. The method of claim 10, further comprising:
  generating a location indicator associated with the relative location of the human within the building; and
  transmitting the location indicator to at least one of the first device, the second device, or the third device associated with the relative location within the building, to direct the at least one of the first device, the second device, or the third device to increase a sampling rate for channel properties.

12. The method of claim 10, wherein the processing comprises:
  separating, by the computing device, the first channel properties associated with a first group of frequencies from the second channel properties associated with a second group of frequencies, to generate the first input variable and the second input variable, respectively;
  summing, by the computing device, the first weighted variable and the second weighted variable to generate a first summed output;
  calculating, by the computing device, a first intermediate output value by applying a sigmoid activation function to the first summed output, wherein the sigmoid activation function maps the first summed output to an interval between zero and one;
  applying, by the computing device, a third weight to the intermediate output value, to generate a second intermediate output value; and
  summing, by the computing device, the first intermediate output value and the second intermediate output value to generate a final output value.

13. The method of claim 12, wherein the processing further comprises applying a locator function to the final output value to detect a relative location of the human within the building, wherein the relative location is with respect to a closest of the first wireless RX, the second wireless RX, and the wireless TX.

14. A wireless device comprising:
  a processor;
  a baseband channel estimator coupled to the processor;
  a first transmitter coupled to the processor and the baseband channel estimator;
  a receiver coupled to the processor and the baseband channel estimator, wherein the receiver is to receive wireless signals through an antenna coupled to the receiver;
  wherein the baseband channel estimator is to detect receipt, via the receiver, of data comprising channel properties that represent wireless signal propagation characteristics of the wireless signals received, in a communication link, from a separate wireless transmitter in a second wireless device within a building;
  wherein the processor is to:
    direct the first transmitter to transmit the data to a remote computing device over a network for neural network processing; and
    direct the receiver to receive a response from the remote computing device containing a presence detection signal, which comprises a neural network indicator that a human is present within wireless range of the antenna; and
  a storage device coupled to the processor, the storage device to store a copy of a classifier received from the remote computing device, the classifier having been trained to detect the human within the building.

15. The wireless device of claim 14, wherein the receiver is further to receive, within the response, a location indicator indicative of a location of the human that is relative to that of the wireless device.

16. The wireless device of claim 14, wherein the data comprises channel state information (CSI) values, received signal strength indicator (RSSI) values, or both.

17. The wireless device of claim 14, wherein the processor is further to:
- process updates to the data to generate updated data comprising the channel properties;
- generate a set of input variables to the neural network via application of a separability function to the updated data that separates the channel properties according to a group of frequencies;
- generate a first weighted data value via application of a first weight to a first input variable of the set of input variables and a second weighted data value via application of a second weight to a second input variable of the set of input variables;
- generate an output value via a combination of the first and the second weighted data values; and
- generate a presence indicator via application of activation function to the output value, wherein the presence indicator is indicative of the presence of the human within the building.

18. A wireless device comprising:
- a processor;
- a baseband channel estimator coupled to the processor;
- a first transmitter coupled to the processor and the baseband channel estimator;
- a receiver coupled to the processor and the baseband channel estimator, wherein the receiver is to receive wireless signals through an antenna coupled to the receiver;
- wherein the baseband channel estimator is to detect receipt, via the receiver, of data comprising channel properties that represent wireless signal propagation characteristics of the wireless signals received, in a communication link, from a separate wireless transmitter in a second wireless device within a building;
- wherein the processor is to:
  - direct the first transmitter to transmit the data to a remote computing device over a network for detection processing;
  - receive a presence pattern from the remote computing device, the presence pattern identifying a particular route through the building where humans have traversed multiple times in the past;
  - determine, based on wireless signal strength, the first transmitter is within wireless range of the particular route; and
- wherein the processor is to direct the baseband channel estimator to increase a sample rate for the channel properties associated with the particular route.

* * * * *